UNITED STATES PATENT OFFICE.

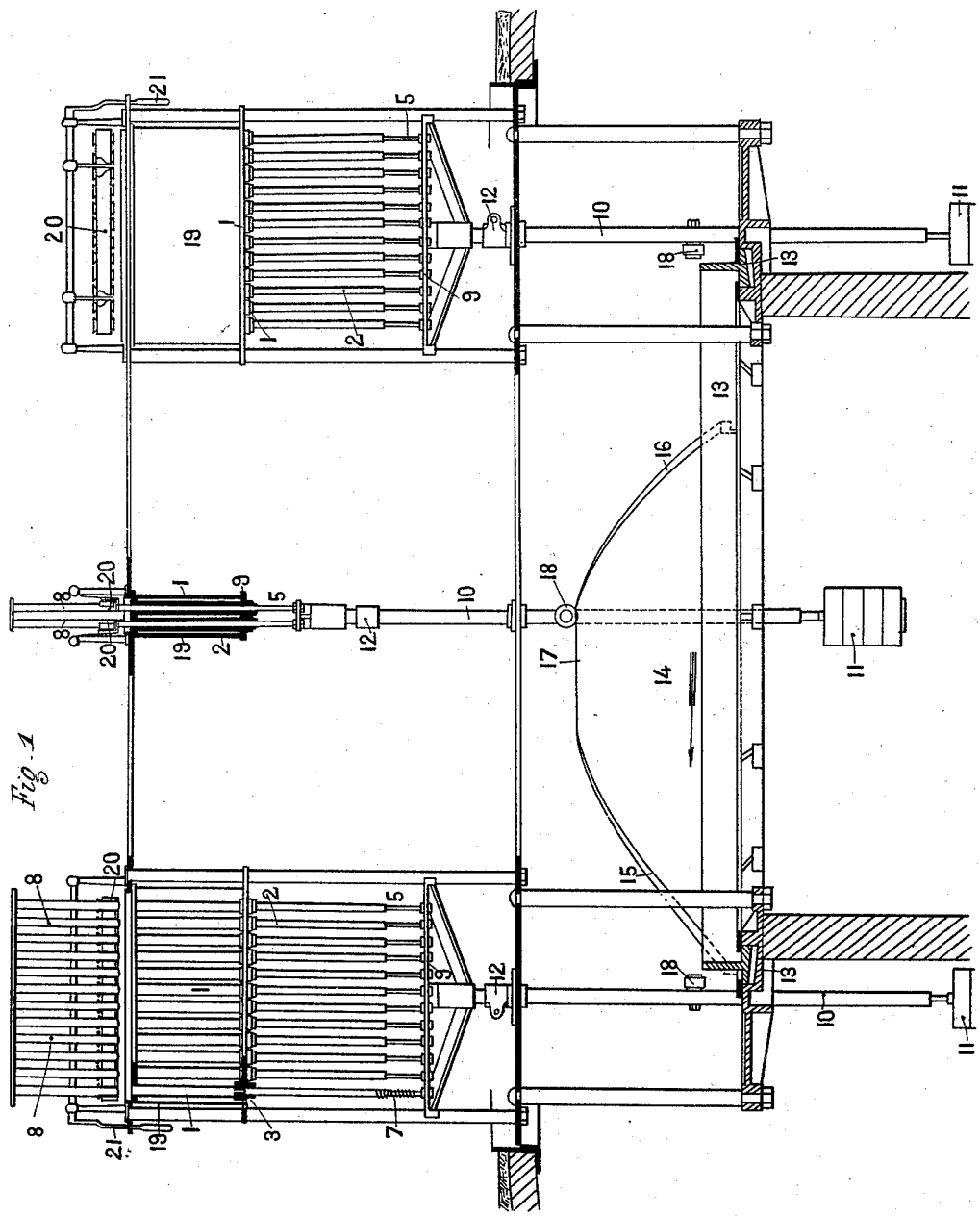

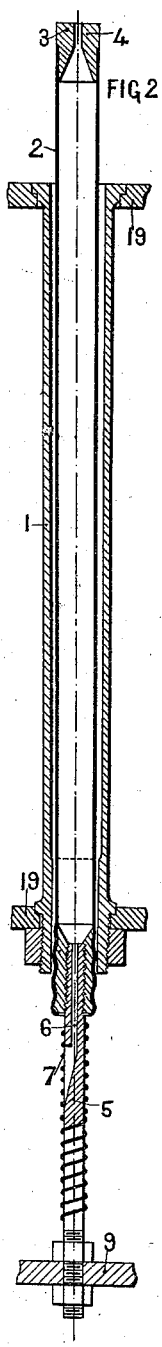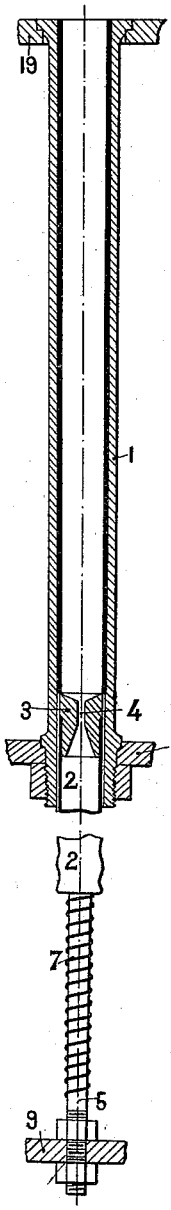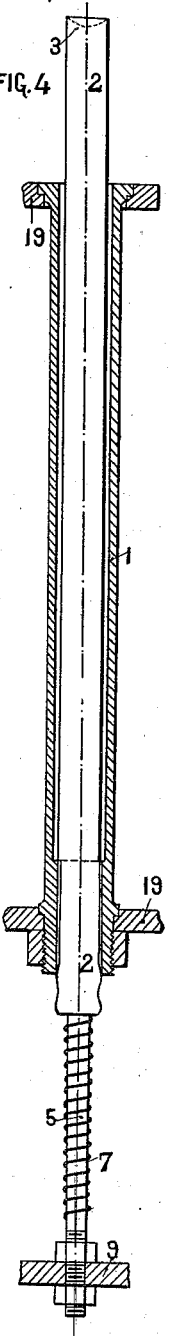

LOUIS J. B. FOURNIER, OF MARSEILLES, FRANCE.

APPARATUS FOR MOLDING WAX-COATED CANDLES.

SPECIFICATION forming part of Letters Patent No. 544,913, dated August 20, 1895.

Application filed May 18, 1895. Serial No. 549,834. (No model.)

*To all whom it may concern:*

Be it known that I, LOUIS JEAN BAPTISTE FOURNIER, a citizen of the French Republic, residing at Marseilles, France, have invented certain new and useful Improvements in Machines for Molding Wax-Coated Candles, of which the following is a specification.

My invention relates to improvements in machines for molding wax-coated candles and is designed to provide means whereby such candles can be molded mechanically and in a perfectly regular manner. The manufacture of wax-coated candles—that is to say, candles composed of an envelope or coating of fine quality stearine and of a core in material of an inferior quality—has long been known; but notwithstanding the great advantages they offer coated candles have not heretofore been produced in a rapid manner owing to the difficulty of obtaining an accurate and uniform product economically.

The principal process heretofore employed was as follows: The molds were filled with a material intended to form an envelope or coating, and after a certain time the machine was inverted so as to cause the material in the center of the mold, which still remained liquid, to run out. After this the fat-acid constituting the core was run into the hollow thus left. It will be readily understood that a process of manufacture carried out upon these lines could not but give a defective product and one of very variable composition on account of the inequality of thickness of the envelope or coating obtained by means of the partial cooling of the first running-in.

Now, according to my invention the envelope or coating is run upon a metallic spindle or mandrel, which is withdrawn upon the cooling taking place and leaves a perfectly regular hollow for the running in of the core.

In order that my invention may be readily understood, I will proceed to describe the same fully with reference to the annexed drawings, in which—

Figure 1 is a general view, in vertical axial section, showing the arrangement of my improved candle-making machine and the outline of the cam employed. Figs. 2, 3, and 4 are vertical axial sections to a larger scale of one of the molds and of its pusher-mandrel in the positions the latter would occupy, respectively, during the running in of the envelope or coating, the running in of the central core of the candle, and after the ejection of the candle from the mold.

Within each of the molds 1, and concentrically therewith, the pusher-mandrel 2 is capable of rising and descending. This latter consists of a metallic tube having an external diameter less than the internal diameter of the mold by an amount equal to twice the thickness to be given to the envelope or coating of the candle, so that there remains between the wall of the mandrel 2 and that of the mold 1 an annular space of uniform width and exactly equal to the thickness of the envelope or coating.

The upper part of the pusher-mandrel 2 is closed by a metallic plug 3, Figs. 2 and 3, presenting in section the form of the tip or point of the candle, and having an axial perforation 4 for allowing the free passage of the wick. The pusher-mandrel 2 is secured at its lower end upon a rod 5, which has a perforation 6, Fig. 2, for the passage of the wick. This latter is clipped between the said rod and the spiral spring 7, with just sufficient pressure to compel it to remain stretched during the descending movement of the pusher-mandrel 2. The working of this arrangement is as follows: The pusher-mandrel 2 being placed in the position shown in Fig. 2, the running in or filling with stearine of the annular space between the mold 1 and the mandrel 2 is effected. On the stearine commencing to set, the mandrel is quickly drawn down to its lowest extent into the position shown in Fig. 3. It is then placed so as to permit the running in of the fat-acid for the central core and the formation of the tip or point of the candle, which is molded in the hollow of the plug 3. This operation being finished and the candle having completely cooled and set, it is then ejected from the mold by the pusher-mandrel 2, which ascends into the position shown in Fig. 4. The candles 8 8 then become placed and are held, as shown on the left and in the middle of Fig. 1, in the manner explained farther on.

The necessary ascending and descending movements are imparted mechanically to the mandrels 2, as hereinafter indicated with reference to Fig. 1 of the drawings.

The pusher-mandrels 2 are arranged vertically, in groups of twenty-four, upon horizontal plates 9, which are carried by vertical rods 10 10, suitably guided in the frame of the machine, and having at their lower parts weights 11 11, which tend constantly to bring them back to the lowest limit of their travel, in which position they are stopped and held by collars 12 12, furnished with pressure-screws, adjustable upon each rod 10.

The rods 10 are all arranged in a circle concentrically with a toothed ring or crown 13, which is caused to rotate continuously in the direction of the arrow, Fig. 1, by means of a pinion or other suitable device. This toothed ring or crown 13 carries a cylindrical cam 14, having two inclined surfaces 15 and 16 and a horizontal surface 17. Said cam in rotating engages successively under the friction-rollers 18, which are carried by each of the rods 10. When one of these friction-rollers ascends the inclined surface 15, the corresponding rod 10 is gradually raised and remains at the upper end of its travel the whole time that its friction-roller is rolling upon the horizontal surface 17. As soon, however, as this roller descends the inclined surface 16 the rod 10 descends under the influence of the weight 11. Each group of pusher-mandrels 2 follows the movement of the rod 10, to which it is connected, and the surfaces of the cam 14 are so determined that the said pusher-mandrels 2 of one group shall be raised or lowered simultaneously in their respective molds 11 at the desired moment to the required extent and for a time sufficient to permit the three successive operations, above described, of running in of the envelope or coating, of running in of the central core, and of driving the hardened candle out of the mold to be effected. The length of travel of the rods 10, and hence of those of the candles manufactured by this machine, may be varied, as desired, by fixing the collars 12 higher up or lower down on the said rods 10.

The boxes 19 19, which surround each group of molds, are filled alternately with hot water during the running-in and with cold water after the running-in so as to facilitate the molding and hasten the cooling of the stearine.

The devices 20 20, which are shown at Fig. 1 at the upper part of the machine, are the clips or rocking rest-pieces which are operated by means of levers 21, and hold the candles 8 8 after they leave the molds and while the workman cuts the wicks and removes them for packing or bundling. Said clips each consist of a nearly annular piece of resilient sheet metal which are adapted to clasp or embrace the candles, and by their elasticity hold them until they are removed by an attendant.

The arrangements previously described for producing, (a,) the raising of the pusher-mandrels 2 2, viz., the toothed ring or crown 13 with rotating cam 14; (b,) the alternate heating and cooling of the molds, viz., the hot and cold water boxes 19; and, (c,) the supporting of the candles after removal from the molds, viz., the rocking rest-pieces, form no part of this invention, they being covered by a prior patent granted to me June 12, 1894, and numbered 521,407, the essential feature of this invention being the pusher-mandrels arranged concentrically with the molds and being of smaller exterior diameter than the interior diameter of such molds. These pusher-mandrels may, however, be employed in all kinds of candle-making machines in which the candles are ejected from the molds by pushers; but I now desire to reserve to myself the exclusive right to the employment of the same for the purpose of manufacturing wax-coated candles.

Having fully described my invention, what I claim, and desire to secure by Letters Patent, is—

In a machine for molding wax coated candles, the combination of a mold, of a cylindrical pusher mandrel having a smaller external diameter than the internal diameter of the mold, said pusher mandrel being arranged centrally within said mold and provided at its upper end with a plug centrally apertured for the passage of a wick and provided upon its upper end with a recess for molding the candle tip, means for projecting said pusher-mandrel into the mold to form an annular space between the mandrel and mold for the reception of the melted wax to form the exterior casing, means for retracting said mandrel for the reception of the filling, and means for raising said mandrel to eject the finished candle, substantially as described.

In testimony whereof I have signed this specification in the presence of two subscribing witnesses.

L. J. B. FOURNIER.

Witnesses:
 J. DE VENELLE,
 AUG. LAPLIEN.